(12) United States Patent
Heyse et al.

(10) Patent No.: US 6,258,256 B1
(45) Date of Patent: *Jul. 10, 2001

(54) CRACKING PROCESSES

(75) Inventors: John V. Heyse, Crockett; Alan G. Kunze, El Cerrito, both of CA (US)

(73) Assignee: Chevron Phillips Chemical Company LP, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/177,822

(22) Filed: Jan. 4, 1994

(51) Int. Cl.[7] .................................................. C01G 9/16
(52) U.S. Cl. ........................ 208/48 R; 208/106; 208/47
(58) Field of Search ............................ 208/48 AA, 48 R, 208/47, 137

(56) References Cited

U.S. PATENT DOCUMENTS

| | | |
|---|---|---|
| H544 | 11/1988 | Castillo et al. . |
| 1,802,695 | 4/1931 | Bennett . |
| 1,883,630 | 10/1932 | Duff . |
| 2,063,596 | 12/1936 | Feiler . |
| 2,263,366 | 11/1941 | Peck et al. . |
| 2,685,543 | 8/1954 | Sindeband . |
| 2,818,374 | 12/1957 | Certa et al. . |
| 2,929,775 | 3/1960 | Aristoff et al. . |
| 3,108,013 | 10/1963 | Chao et al. . |
| 3,160,671 | 12/1964 | Feigelman . |
| 3,169,000 | 2/1965 | Earnst et al. . |
| 3,178,321 | 4/1965 | Scatterfield . |
| 3,216,789 | 11/1965 | Breck et al. . |
| 3,284,526 | 11/1966 | Frayer . |
| 3,415,737 | 12/1968 | Kluksdahl . |
| 3,459,821 | 8/1969 | Engelbrecht . |
| 3,505,028 | 4/1970 | Douthit . |
| 3,507,781 | 4/1970 | Spurlock et al. . |
| 3,531,394 | 9/1970 | Kuszman . |
| 3,531,543 | 9/1970 | Clippinger et al. . |
| 3,536,776 | 10/1970 | Lo . |
| 3,554,902 | 1/1971 | Buss . |
| 3,584,060 | 6/1971 | Rausch . |
| 3,607,960 | 9/1971 | Button . |
| 3,615,357 | 10/1971 | Wainer . |
| 3,617,359 * | 11/1971 | Wakefield ................ 117/107.2 R |
| 3,623,901 | 11/1971 | Forstmann et al. . |
| 3,631,215 | 12/1971 | Clippinger et al. . |
| 3,634,147 | 1/1972 | Helwig . |
| 3,650,944 | 3/1972 | McCoy et al. . |
| 3,686,340 | 8/1972 | Patrick et al. . |
| 3,700,745 | 10/1972 | Kovach et al. . |
| 3,708,550 | 1/1973 | Beuther et al. . |
| 3,718,578 | 2/1973 | Buss et al. . |
| 3,732,123 | 5/1973 | Stolfa et al. . |

(List continued on next page.)

FOREIGN PATENT DOCUMENTS

| | | |
|---|---|---|
| 556 396 | 11/1974 | (CH) . |
| 0 082 920 | 7/1983 | (EP) . |
| 0 146 081 | 6/1985 | (EP) . |
| 0 192 059 | 8/1986 | (EP) . |
| 0 201 856 | 11/1986 | (EP) . |
| 0 241 020 | 10/1987 | (EP) . |
| 0 320 549 | 6/1989 | (EP) . |
| 0 351 067 | 1/1990 | (EP) . |
| 0 403 976 | 12/1990 | (EP) . |
| 0 498 182 | 8/1992 | (EP) . |
| 2 500 468 | 8/1982 | (FR) . |
| 317303 | 4/1929 | (GB) . |
| 313303 | 8/1929 | (GB) . |
| 1054121 | 1/1967 | (GB) . |
| 1122017 | 7/1968 | (GB) . |
| 1149163 | 4/1969 | (GB) . |
| 1521848 | 4/1969 | (GB) . |
| 1202511 | 8/1970 | (GB) . |
| 1319265 | 6/1973 | (GB) . |
| 1393365 | 5/1975 | (GB) . |
| 1423889 | 2/1976 | (GB) . |
| 2 066 696 | 7/1981 | (GB) ............................ B01J/19/02 |
| 1604604 | 12/1981 | (GB) . |
| 2162082 | 1/1986 | (GB) . |
| 2234530 | 2/1991 | (GB) . |
| 56-41363 | 4/1981 | (JP) . |
| 57-8287 | 1/1982 | (JP) . |
| 57-105485 | 6/1982 | (JP) . |
| 57-161056 | 10/1982 | (JP) . |
| 57-181784 | 11/1982 | (JP) . |
| 58-109589 | 6/1983 | (JP) . |
| 58-198587 | 11/1983 | (JP) . |
| 59-157494 | 9/1984 | (JP) . |
| 59-193264 | 11/1984 | (JP) . |
| 60-99193 | 6/1985 | (JP) . |
| 62-132995 | 6/1987 | (JP) . |
| 62-210047 | 9/1987 | (JP) . |
| 63-65057 | 3/1988 | (JP) . |
| 63-19567 | 8/1988 | (JP) . |
| 64-18502 | 1/1989 | (JP) . |
| 5-93239 | 4/1993 | (JP) . |
| 5-93240 | 4/1993 | (JP) . |
| 5-93248 | 4/1993 | (JP) . |
| WO92/15653 | 9/1992 | (WO) . |
| WO 94/15898 | 7/1994 | (WO) . |
| WO94/15896 | 7/1994 | (WO) . |
| WO 95/18849 | 9/1995 | (WO) . |
| WO 96/05269 | 2/1996 | (WO) . |
| WO 96/41904 | 12/1996 | (WO) . |

Primary Examiner—Bekir L. Yildirim
(74) Attorney, Agent, or Firm—Pennie & Edmonds LLP

(57) ABSTRACT

Methods for cracking hydrocarbons in reactor systems having improved resistances to carburization and coking. The reactor system comprises a steel portion having provided thereon a chromium protective layer to isolate the steel portion from hydrocarbons, applied to a thickness effective for completely isolating the steel portion from the hydrocarbon environment. The protective layer is anchored to the steel substrate through an intermediate carbide-rich, bonding layer.

60 Claims, No Drawings

U.S. PATENT DOCUMENTS

| | | |
|---|---|---|
| 3,743,551 | 7/1973 | Sanderson . |
| 3,767,456 * | 10/1973 | Glaski ............................ 117/71 M |
| 3,783,123 | 1/1974 | Young . |
| 3,785,847 | 1/1974 | Wisniewski . |
| 3,827,967 | 8/1974 | Nap et al. . |
| 3,833,358 * | 9/1974 | Bellot et al. .......................... 75/122 |
| 3,835,183 | 9/1974 | Carpenter et al. . |
| 3,864,284 | 2/1975 | Clippinger et al. . |
| 3,867,512 | 2/1975 | Young . |
| 3,878,131 | 4/1975 | Hayes . |
| 3,884,797 | 5/1975 | Alley, Jr. et al. . |
| 3,890,110 * | 6/1975 | Glaski .................................. 29/198 |
| 3,890,686 | 6/1975 | Caubet . |
| 3,898,153 | 8/1975 | Louder et al. . |
| 3,907,916 | 9/1975 | Soderquist et al. . |
| 3,919,073 * | 11/1975 | Bagnoli et al. ........................ 208/47 |
| 3,944,396 | 3/1976 | Chivinsky . |
| 3,955,935 * | 5/1976 | Shockley .............................. 29/194 |
| 3,966,833 | 6/1976 | Cosyns et al. . |
| 4,012,313 | 3/1977 | Buss et al. . |
| 4,013,487 | 3/1977 | Ramqvist et al. . |
| 4,015,950 | 4/1977 | Galland et al. . |
| 4,017,336 | 4/1977 | Foroulis . |
| 4,019,969 | 4/1977 | Golebiowski et al. . |
| 4,033,898 | 7/1977 | Jacobson et al. . |
| 4,048,057 | 9/1977 | Murphy . |
| 4,058,452 | 11/1977 | Loboda . |
| 4,104,320 | 8/1978 | Bernard et al. . |
| 4,111,763 | 9/1978 | Pryor . |
| 4,132,743 | 1/1979 | Caster et al. . |
| 4,155,836 | 5/1979 | Collins et al. . |
| 4,161,510 | 7/1979 | Edridge . |
| 4,163,706 | 8/1979 | Horowitz et al. . |
| 4,163,708 | 8/1979 | Jacobson et al. . |
| 4,167,532 | 9/1979 | Walker et al. . |
| 4,167,533 | 9/1979 | Raymond . |
| 4,173,457 * | 11/1979 | Smith .................................. 51/309 |
| 4,179,361 | 12/1979 | Michimayr . |
| 4,180,455 | 12/1979 | Taciuk . |
| 4,189,613 | 2/1980 | Bjornson . |
| 4,191,632 | 3/1980 | Cosysns et al. . |
| 4,191,846 | 3/1980 | Farha, Jr. et al. . |
| 4,204,997 | 5/1980 | Hobbs et al. . |
| 4,208,302 | 6/1980 | McKay . |
| 4,215,231 | 7/1980 | Raymond . |
| 4,220,560 | 9/1980 | Anquetil et al. . |
| 4,225,417 | 9/1980 | Nelson . |
| 4,229,603 | 10/1980 | Lyon . |
| 4,264,433 | 4/1981 | McKay . |
| 4,268,188 | 5/1981 | Bertus . |
| 4,271,008 | 6/1981 | Vogt et al. . |
| 4,297,150 | 10/1981 | Foster et al. . |
| 4,324,648 | 4/1982 | Roberts et al. . |
| 4,325,994 | 4/1982 | Kitashima et al. . |
| 4,329,173 | 5/1982 | Culling . |
| 4,343,658 | 8/1982 | Baker et al. . |
| 4,347,396 | 8/1982 | Takano et al. . |
| 4,348,271 | 9/1982 | Swan . |
| 4,350,719 * | 9/1982 | Baldi .................................. 427/253 |
| 4,368,172 * | 1/1983 | Takahashi et al. .................... 420/584 |
| 4,377,495 | 3/1983 | Tse . |
| 4,385,645 | 5/1983 | Campbell et al. . |
| 4,404,087 | 9/1983 | Reed . |
| 4,410,418 | 10/1983 | Kukes et al. . |
| 4,416,806 | 11/1983 | Bernard et al. . |
| 4,438,288 | 3/1984 | Imai . |
| 4,444,732 * | 4/1984 | Konoki et al. ........................ 422/310 |
| 4,447,316 | 5/1984 | Buss . |
| 4,451,687 | 5/1984 | Daly et al. . |
| 4,456,527 | 6/1984 | Buss et al. . |
| 4,463,206 | 7/1984 | Derrien et al. . |
| 4,467,016 | 8/1984 | Baldi . |
| 4,471,151 | 9/1984 | Kolts . |
| 4,481,264 | 11/1984 | Faure . |
| 4,482,637 | 11/1984 | Buss et al. . |
| 4,488,578 | 12/1984 | Tseung et al. . |
| 4,500,364 | 2/1985 | Krutenat . |
| 4,507,196 * | 3/1985 | Reed et al. ....................... 208/48 AA |
| 4,507,397 | 3/1985 | Buss . |
| 4,511,405 | 4/1985 | Reed . |
| 4,529,626 | 7/1985 | Baker et al. . |
| 4,536,455 * | 8/1985 | Maeda et al. ........................ 428/629 |
| 4,545,893 | 10/1985 | Porter et al. . |
| 4,551,227 | 11/1985 | Porter et al. . |
| 4,552,643 | 11/1985 | Porter . |
| 4,555,326 * | 11/1985 | Reid .................................. 208/48 R |
| 4,595,673 | 6/1986 | Imai et al. . |
| 4,610,972 | 9/1986 | Hughes . |
| 4,613,372 | 9/1986 | Porter . |
| 4,613,715 | 9/1986 | Haskell . |
| 4,634,518 | 1/1987 | Buss et al. . |
| 4,665,267 | 5/1987 | Barri . |
| 4,666,583 | 5/1987 | Porter . |
| 4,666,589 | 5/1987 | Klein et al. . |
| 4,681,865 | 7/1987 | Katsuno et al. . |
| 4,685,427 | 8/1987 | Tassen et al. . |
| 4,686,201 | 8/1987 | Porter . |
| 4,687,567 | 8/1987 | Porter . |
| 4,692,234 | 9/1987 | Porter . |
| 4,692,313 | 9/1987 | Watanabe et al. . |
| 4,716,143 | 12/1987 | Imai . |
| 4,717,700 | 1/1988 | Venkstram et al. . |
| 4,727,216 | 2/1988 | Miller . |
| 4,741,819 * | 5/1988 | Robinson et al. . |
| 4,743,318 * | 5/1988 | Fischer et al. . |
| 4,761,512 | 8/1988 | Katsuno et al. . |
| 4,762,681 * | 8/1988 | Tassen et al. . |
| 4,786,625 * | 11/1988 | Imai et al. . |
| 4,795,732 * | 1/1989 | Barri . |
| 4,804,446 * | 2/1989 | Lashmore et al. ..................... 204/51 |
| 4,804,487 * | 2/1989 | Reed . |
| 4,827,072 * | 5/1989 | Imai et al. . |
| 4,830,732 | 5/1989 | Mohr et al. . |
| 4,861,458 | 8/1989 | Martin et al. . |
| 4,863,892 * | 9/1989 | Porter et al. ........................ 502/170 |
| 4,886,928 | 12/1989 | Imai et al. . |
| 4,902,849 * | 2/1990 | McKay et al. . |
| 4,917,969 * | 4/1990 | Pircher . |
| 4,925,549 * | 5/1990 | Robinson et al. . |
| 4,926,005 * | 5/1990 | Olbrich et al. . |
| 4,935,566 | 6/1990 | Dessau et al. . |
| 4,940,532 | 7/1990 | Peer et al. . |
| 4,940,828 | 7/1990 | Petterson et al. . |
| 4,954,245 | 9/1990 | Miller et al. . |
| 4,975,178 | 12/1990 | Clem et al. . |
| 4,976,932 * | 12/1990 | Maeda et al. . |
| 4,982,047 * | 1/1991 | Barri et al. . |
| 5,009,963 | 4/1991 | Ohmi et al. . |
| 5,012,027 * | 4/1991 | Abrevaya et al. . |
| 5,015,358 * | 5/1991 | Reed . |
| 5,035,792 | 7/1991 | Foutsitzis et al. . |
| 5,041,208 | 8/1991 | Patridge et al. . |
| 5,053,572 | 10/1991 | Kim et al. . |
| 5,053,574 * | 10/1991 | Tsutsui et al. . |
| 5,073,652 | 12/1991 | Katsuno et al. . |
| 5,091,351 | 2/1992 | Murakawa et al. . |
| 5,107,061 | 4/1992 | Ou et al. . |
| 5,110,854 | 5/1992 | Ratliff . |
| 5,118,028 * | 6/1992 | Ogawa et al. . |
| 5,128,300 | 7/1992 | Chao et al. . |
| 5,139,814 * | 8/1992 | Sugaro . |

| | | |
|---|---|---|
| 5,139,914 * | 8/1992 | Tomiyama et al. . |
| 5,196,631 | 3/1993 | Murakawa et al. . |
| 5,196,632 | 3/1993 | Larsen et al. . |
| 5,208,069 | 5/1993 | Clark et al. . |
| 5,238,492 * | 8/1993 | Itoh et al. .............................. 106/436 |
| 5,242,665 * | 9/1993 | Maeda et al. ........................ 422/240 |
| 5,260,238 | 11/1993 | Murakawa et al. . |
| 5,275,645 | 1/1994 | Ternoir et al. . |
| 5,279,998 | 1/1994 | Mulaskey et al. . |
| 5,298,091 | 3/1994 | Edwards, III et al. . |
| 5,322,615 | 6/1994 | Holtermann et al. . |
| 5,376,464 | 12/1994 | Dupoiron et al. . |
| 5,397,652 | 3/1995 | Carey, II et al. . |
| 5,401,894 | 3/1995 | Brasier et al. . |
| 5,405,525 | 4/1995 | Heyse et al. . |
| 5,406,014 | 4/1995 | Heyse et al. . |
| 5,413,700 | 5/1995 | Heyse et al. . |
| 5,472,593 | 12/1995 | Gosling et al. . |
| 5,516,421 | 5/1996 | Brown et al. . |
| 5,575,902 * | 11/1996 | Heyse et al. ........................ 208/48 R |
| 5,593,571 | 1/1997 | Heyse et al. . |
| 5,614,454 | 3/1997 | Galperin et al. . |
| 5,648,178 * | 7/1997 | Heyse et al. ........................ 428/627 |
| 5,658,452 | 8/1997 | Heyse et al. . |
| 5,674,376 | 10/1997 | Heyse et al. . |
| 5,676,821 | 10/1997 | Heyse et al. . |
| 5,710,356 | 1/1998 | Subramaniam et al. . |
| 5,723,707 | 3/1998 | Heyse et al. . |
| 5,807,842 | 9/1998 | Buscemi et al. . |
| 5,833,838 | 11/1998 | Heyse et al. . |
| 5,849,969 | 12/1998 | Heyse et al. . |
| 5,863,418 | 1/1999 | Heyse et al. . |
| 5,866,743 | 2/1999 | Heyse et al. . |
| 5,914,028 | 6/1999 | Wilson et al. . |
| 6,019,943 | 2/2000 | Buscemi et al. . |
| 6,139,909 | 10/2000 | Hagewiesche . |

* cited by examiner

CRACKING PROCESSES

BACKGROUND OF THE INVENTION

The invention relates to processes for the cracking of hydrocarbons, particularly for the thermal cracking of a gaseous stream containing hydrocarbons.

In thermal cracking operations a diluent fluid such as steam is usually combined with a hydrocarbon feed such as ethane and/or propane and/or naphtha, and introduced into a cracking furnace. Within the furnace, the feed stream which has been combined with the diluent fluid is converted to a gaseous mixture which primarily contains hydrogen, methane, ethylene, propylene, butadiene, and small amounts of heavier gases. At the furnace exit this mixture is cooled to remove most of the heavier gases, and then compressed. The compressed mixture is routed through various distillation columns where the individual components such as ethylene are purified and separated.

One recognized problem in thermal cracking is the formation of coke. Because coke is a poor thermal conductor, as coke is deposited higher furnace temperatures are required to maintain the gas temperature in the cracking zone at necessary levels. Higher temperatures increase feed consumption and shorten tube life. Also, cracking operations are typically shut down periodically to burn off deposits of coke. This downtime adversely affects production.

Another problem in thermal cracking is the embrittlement of the steel walls in the reaction system. Such embrittlement is due to carburization of the system metallurgy, and ultimately leads to metallurgical failure.

A variety of solutions have been proposed for addressing the problem of coke formation in thermal cracking processes. U.S. Pat. No. 5,015,358 describes certain titanium antifoulants; U.S. Pat. Nos. 4,863,892 and 4,507,196 describe certain antimony and aluminum antifoulants; U.S. Pat. Nos. 4,686,201 and 4,545,893 describe certain antifoulants which are combinations of tin and aluminum, aluminum and antimony, and tin, antimony and aluminum; U.S. Pat. Nos. 4,613,372 and 4,5524,643 describe certain antifoulants which are combinations of tin and copper, antimony and copper, and tin, antimony and copper; U.S. Pat. Nos. 4,666,583 and 4,804,487 describe certain antifoulants which are combinations of gallium and tin, and gallium and antimony; U.S. Pat. No. 4,687,567 describes certain antifoulants which are combinations of indium and tin, and indium and antimony; U.S. Pat. No. 4,692,234 describes certain antifoulants which are combinations of tin and silicon, antimony and silicon, and tin, antimony and silicon; U.S. Pat. No. 4,551,227 describes certain antifoulants which are combinations of tin and phosphorus, phosphorus and antimony, and tin, antimony and phosphorus; U.S. Pat. No. 4,511,405 describes certain tin antifoulants, and antifoulants which are combinations of tin and antimony, germanium and antimony, tin and germanium, and tin, antimony and germanium; U.S. Pat. No. 4,404,087 describes certain tin antifoulants, and antifoulants which are combinations of tin and antimony, germanium and antimony, tin and germanium, and tin, antimony and germanium; and U.S. Pat. No. 4,507,196 describes certain chromium antifoulants, and antifoulants which are combinations of chromium and tin, antimony and chromium, and tin, antimony and chromium.

In King et al, "The Production of Ethylene by the Decomposition of n-Butane; the Prevention of Carbon Formation by the Use of Chromium Plating", Trans. of the E.I.C., 3, #1, 1 (1959), there is described an application of a 3/1000 inch thick chromium plate to a stainless steel reactor. This chromium plate is described as peeling-off the surfaces of the steel after a period of several months of operation, which was attributed to the high temperatures required for the reaction, and periodic heating and cooling.

SUMMARY OF THE INVENTION

Accordingly, one object of the invention is to provide an improved method for the cracking of hydrocarbons, where catalytic coking is minimized, and carburization in the reactor system is reduced.

Among other factors the invention is based on the discovery that a chromium protective layer effective for resisting carburization and coking, can be provided on a portion, or portions of the reactor system exposed to hydrocarbons, which, unlike prior art chromium layers, is resistant to peeling.

According to this invention there is used an intermediate bonding layer which anchors the chromium protective layer to the steel substrate to be protected. In this regard, the reactor system comprises a steel portion having provided thereon a chromium protective layer to isolate the steel portion from hydrocarbons, applied to a thickness effective for completely isolating the steel portion from the hydrocarbon environment. The protective layer is anchored to the steel substrate through an intermediate carbide-rich, bonding layer.

Simply providing a protective plating, cladding or other coating such as a paint to a reactor system will not be sufficient to completely address the aforementioned problems. Such a protective layer must be of sufficient thickness to provide a complete, uninterrupted coating of the underlying base metal, and it must remain complete over time.

Cracks have been observed to form in chromium protective layers, especially after the initial heating of an electroplated material. These cracks can allow steam (which is typically present) to attack the steel chromium interface and undermine the chromium protective layer. According to another embodiment of the invention there is provided a novel procedure which includes a step of treating a chromium coated surface with hydrocarbons in the absence of steam which produces a metal carbide filler of the cracks which effectively seals-off the chromium coating and carbide-rich bonding layer from $H_2O$ attack.

An effective protective layer must resist deleterious chemical alteration, as well as peeling. Additionally, the protective layer must maintain its integrity through operation. As such, the protective coating must be sufficiently abrasion resistant during start-up and operation. The chromium-based coatings according to the invention have these advantages.

Preferably, the chromium protective layer is applied as a reducible paint which upon curing in a $H_2$-rich (or pure) environment, in the absence of hydrocarbon or steam, forms a continuous chromium metal layer of substantial thickness, indistinguishable from an electroplated material, except that it is virtually free of cracks and very finely and cleanly anchored to the underlying steel through a carbide-rich bonding layer. Chromium paint protection can be applied and cured in situ to an existing plant.

Moreover, a chromium paint such as that described above can be applied to a previously chromium-plated surface. The curing treatment for the paint causes chromium metal to fill cracks in the plate as they form, thereby producing a smooth, substantially crack-free chromium coating. The paint can also be used to repair damaged, previously chromium-plated steel.

The chromium paints are especially useful to treat welds and other hard to reach areas that are otherwise untreatable by plating.

With the foregoing, as well as other objects, advantages, features and aspects of the disclosure that will become hereinafter apparent, the nature of the disclosure may be more clearly understood by reference to the detailed description and the appended claims.

DETAILED DESCRIPTION OF THE PREFERRED EMBODIMENTS

The invention will be described hereinafter in terms of the thermal cracking of a hydrocarbon feed to produce e.g., ethylene. However, the various aspects of the invention are not intended to be limited to that embodiment. As will be apparent to those skilled in the art, they are useful in other areas of high temperature hydrocarbon processing such as both thermal and catalytic cracking of a variety of feeds to produce a variety of desired products. Also, while the invention is described in terms of using chromium to produce a protective layer, molybdenum, tungsten, and mixtures thereof, with or without the use of chromium, may be used as well.

Generally the invention is directed to a process for thermally cracking hydrocarbons. The process comprises (i) providing a carburization, abrasion and peeling resistant chromium protective layer to a steel portion of a cracking reactor system by (a) applying to the steel portion a chromium plating, cladding or other coating of chromium effective for forming a carburization resistant protective layer, to a thickness effective to isolate the steel portion from hydrocarbons during operation, and (b) forming the protective layer, anchored to the steel portion through an intermediate carbide-rich bonding layer; and then, (ii) thermally cracking a hydrocarbon feed.

"Reactor system" as used herein refers to at least one cracking furnace including any cracking or furnace tubes thereof, as well as its associated heat exchangers, piping, etc., effective to crack a feed material into desired products such as ethylene. By "surfaces susceptible to carburization," there is intended at least those surfaces of the reactor system that are in contact with hydrocarbons during processing wherein carburization will take place under reaction conditions. Typically those surfaces susceptible to carburization to which protective layers according to the invention should be applied are those portions of the reactor system which exhibit skin temperatures of at least 1200° F., preferably at least 1700° F., during operation.

The chromium protective layer according to the invention can be applied as a plating, cladding or other coating such as chromium-containing paint. Then the plating, cladding or other coating is treated in a manner effective to form a protective layer which is anchored to the steel substrate through a carbide-rich bonding layer thereby providing the necessary abrasion resistance, and resistance to peeling. Preferably, the plating, cladding, or coating is resistant to abrasion, peeling or flaking for a period of 1 year, preferably 2 years, and more preferably 3 years such that the reactor system will maintain its carburization resistant properties without reapplication.

Forming a protective layer suitably anchored to the steel substrate and resistant to carburization, will depend on treatment after application of the chrome. Once applied, the chromium plating, cladding or other coating should be cured at a temperature, and for a time effective to produce the intermediate carbide-rich bonding layer.

Where practical, it is preferred that the resistant materials be applied in a paint-like formulation (hereinafter "paint") to a new or existing reactor system. Such a paint can be sprayed, brushed, pigged, etc. on reactor system surfaces such as mild steels or stainless steels, and will have viscosity characteristics sufficient to provide a substantially continuous coating of measurable and substantially controllable thickness.

The thickness of the paint after application should be between 0.1 and 15 mils, preferably 1 and 10 mils, and more preferably between 2 and 8 mils. The metallic coatings and, in particular, the paints, are then preferably treated under reducing conditions with hydrogen. Curing is preferably done in the absence of hydrocarbons and/or steam. It is important to avoid formation of metal oxides under the carbide-rich bonding layer. Curing results, for example, in a strong protective layer preferably between 0.5 and 10 mils thick, and more preferably between 1 and 4 mils thick.

Microscopic analysis can readily determine the thickness of the protective layer. For ease of measurement of paint and coating thickness, coupons can be prepared which correspond to the painted reactor surface. These can be treated under identical conditions to the reactor system treatment. The coupons can be used to determine paint and coating thickness.

In addition to applied thickness, viscosity and other properties of the paint are important. The viscosity should be such that the paint can be easily applied and that it does not drip or pool due to gravity.

For chromium-containing paints, it is preferable to initially cure the paint at temperatures below those typically exhibited during thermal cracking. Curing temperatures between 1200 and 1800° F., preferably between 1400 and 1600° F., provide a carburization-resistant chromium protective layer anchored to a steel substrate through a carbide-rich bonding layer.

As an example of a suitable paint cure, the system including painted portions can be pressurized with $N_2$, followed by the addition of $H_2$ to a concentration greater than or equal to 50% $H_2$. The reactor inlet temperature can be raised to 500° F. at a rate of 10–100° F./hr. Thereafter the temperature can be raised to a level of 1400 to 1600° F. at a rate of 10–20° F./hr, and held within that range for about 48 hours. Curing can also be achieved in pure $H_2$ at 1300° F. to 1600° F. for 2–24 hours; preferably the full 24 hours to fully develop the carbide-rich bonding layer.

Slow heating can minimize crack formation. Inevitably, however, cracks will appear in the chromium layer due to different thermal expansion properties of the base steel and the chromium. Therefore, in a preferred embodiment the cured plating, cladding, or other coating is then contacted with hydrocarbons at temperatures common to a cracking environment (e.g., about 1750 to 2050° F.), in the absence of steam. The hydrocarbons used in this treatment step should be relatively free of impurities, preferably completely free of impurities, such as oxygen compounds, sulfur compounds, and water. Useful hydrocarbons include ethane, propane, butane, and the like. This treatment will form chromium carbides which over time (e.g. 0.5 to preferably 24 hours) will fill the cracks and effectively seal the chromium coating and carbide-rich bonding layer from $H_2O$/steam attack.

The chromium carbide surface is preferably treated with steam prior to being subjected to cracking service. This steam treatment, in the absence of hydrocarbons, produces a thin chromium oxide layer over the chrome carbide layer. This oxide layer protects the chrome carbides from attack by metal antifoulant compounds and feed impurities, such as sulfur compounds.

Thus, in a further preferred embodiment, the cured and hydrocarbon-treated plating, cladding or other coating can be then treated with steam at a temperature (e.g. $\geq 1700°$ F.), and for a time effective to produce an oxide coating on the surface to be contacted with the hydrocarbons during cracking. It has been surprisingly found that at lower temperatures steam will penetrate and react with the chromium carbide that fills the cracks and the carbide-rich bonding layer, but not at higher temperatures. Thus, it has been found to be important that the temperatures be above 1600° F., preferably above 1700° F., more preferably above 1750° F., when the protective layers of this invention are contacted with steam.

Chromium-containing paints are particularly preferred as they are less expensive than chrome plating, and will produce a protective layer exhibiting fewer cracks. In fact, protective layers formed from chromium-containing paints have been observed to be relatively crack-free. Additionally, paints can be used to provide protective layers to areas not readily accessible to e.g., platings, such as welds. In this regard, combinations of techniques can be used. For example, platings can be used for easily accessible areas while paints can be used for those areas not readily accessible to platings. Also, a chromium-containing paint can be applied to a newly or previously chrome plated surface to fill cracks.

The use of paints containing chromium halides is preferred, especially chromium chlorides ($CrCl_2$ and $CrCl_3$). Paints based on chromium halides appear to be self-fluxing and form strongly adherent coatings. One advantage of the chromium coatings is that they do not result in liquid metal embrittlement. Chromium paints are preferably reduced at high temperatures in order to produce metallic chromium-containing coatings. Useful reduction temperatures are above 1200° F., preferably at about 1400° F. or higher (e.g., 1500° F.).

An example of a useful paint would be one comprising a fusible $CrCl_2$ or $CrCl_3$ salt which may or may not be incorporated with solvents and other additives. Other specific formulations include finely ground $CrCl_3$ in 90 wt. gear oil to form a viscous liquid, and finely ground $CrCl_3$ in a petroleum jelly carrier. Such a paint provides a simple low cost method of applying chromium to steel, as it provides clean contact with the steel substrate which permits curing procedures to firmly attach the chromium to the steel. As an example, the paint can be reduced in $H_2$ or another suitable gas at about 1500° F. for 1 hour.

Thicker protective layers can also be provided. For example, layers can be built-up by successively painting and curing the steel surface.

While a variety of materials such as tin, antimony, germanium, etc. have been suggested for use as antifoulants in thermal cracking processes, chrome-based protective layers would likely be more desirable under cracking conditions than one which is tin-based, for example. A chromium protective layer has exhibited good resistance to a number of environments such as carburizing, oxidizing, and chloriding environments. Chromium is believed to be more robust than tin under such conditions. In this regard, tests suggest that a chrome plating is more resistant to metal migration (loss), and a chrome coating would be harder making it less likely to rub off.

Essentially any steel can be protected according to the invention including stainless steels. Chromium platings are preferably applied to heat-resistant nickel-rich steels for better bonding. Such steels include HP-50 and HK-40 steels which are 30–35% Ni and 20–25% Cr.

According to a thermal cracking operation of the present invention, a diluent fluid such as steam can be combined with a hydrocarbon feed such as ethane and/or propane and/or naphtha, and introduced into a cracking furnace. Within the furnace, the feed stream which has been combined with the diluent fluid will be converted to a gaseous mixture which primarily contains hydrogen, methane, ethylene, propylene, butadiene, and small amounts of heavier gases. At the furnace exit this mixture will be cooled to remove most of the heavier gases, and then compressed. The compressed mixture can then be routed through various distillation columns where the individual components such as ethylene are purified and separated.

The cracking furnace may be operated at any suitable temperature or pressure. For example, in the process of steam cracking of light hydrocarbons to ethylene, the temperature of the fluid flowing through the cracking tubes increases during processing and will attain a temperature of about 1575° F. The wall temperatures of the cracking tubes will be even higher. Furnace temperatures of nearly 2100° F. may be reached. Typical pressures for a cracking operation will generally be in the range of about 5 to about 20 psig at the outlet of the cracking tube.

One advantage of the present process is that it can be operated with less steam. Steam is traditionally added to olefin crackers. In part it is added to passivate the coking and carburization tendency of the steel. At lower steam levels, the steel becomes carburized and embrittled relatively rapidly, leading to premature failure. Using the current invention, less steam can be used, for example, to increase throughput.

To obtain a more complete understanding of the present disclosure, the following example illustrating certain aspects of the invention is set forth. It should be understood, however, that the disclosure is not limited in any way to the specific details set forth therein.

EXAMPLE 1

Chromium-plated steels were tested for their carburization and catalytic coking resistance in high temperature environments (e.g., 800° F.–2000° F.). In a cracking environment of 2000° F. for 1 hour in a carburizing gas of 7% $C_3H_8$ in $H_2$ bubbled through $H_2O$ doped with sufficient $CS_2$ to provide approximately 100 ppm sulfur, a chromium plated 304 stainless steel sample did not exhibit coking or carburization, whereas an untreated sample of INCOLOY 800, and samples of stannided and antimonided nickel-plated INCOLOY 800 did exhibit coking. In the complete absence of sulfur, the chromium-plated sample did exhibit coking, but much less than the untreated sample.

In the aforementioned test, chromium was applied as a plating and heat treated to weld or glue the chromium to the steel. The chromium plate was found to have reacted with the steel substrate to form a glue composed of CrFe and chromium carbide; with a coating of $Cr_2O_3$ forming on the exterior.

EXAMPLE 2

One environment which is particularly harsh is a halogen containing environment. The presence of halogens adversely affects raw steels. The chromium protective layers of the invention are surprisingly effective for isolating the steels from those halogen effects at high temperatures. The protective layers of the invention are effective at even high halogen concentrations.

The following tests were run to demonstrate the effectiveness of chromium protective layers for isolating underlying metallurgy from halogen containing environments. The tests were done in a Lindberg quartz tube furnace.

Samples of stainless steel, provided with stannide protective layers and chrome protective layers, were tested at 1000° F. and 1200° F. for twenty-one hours, in the presence of methylchloride. The coupons were placed in an open quartz boat within the hot zone of a tube furnace. The tube was flushed with nitrogen for a few minutes. Then the samples were exposed to a hydrocarbon gas. For experiments using 10,000 ppm halogen the gas was 1% $CH_3Cl$ in hydrogen. For those using 1,000 ppm halogen the gas was a mixture of 0.1% $CH_3Cl$ and 7% propane in hydrogen. Gas flows were 25 to 30 cc/min. at atmospheric pressure. The samples were rapidly brought to operating temperatures.

The test results are shown in the following Table. A "pass" result means the samples did not substantially form coke on the metal surface.

TABLE

Effect of Chloride

| Ex. No. | Amount of MeCl, ppm | Temp. ° F. | Raw Steel | Stannide Protective Layer | Chromium-Protective Layer |
|---|---|---|---|---|---|
| 1 | 10,000 | 1000 | Fail | Pass | Pass |
| 2 | 10,000 | 1200 | Fail | Fail | Pass |
| 3 | 1,000 | 1200 | Fail | Pass | Pass |

The results show that both chromium and stannide protected steel can withstand high halogen concentrations at 1000° F., but the stannided protective layer is not as effective at 1200° F. Chrome protective layers were effective under all conditions tested.

EXAMPLE 3

Dry carburization tests were run using 7% $C_3H_8$, in $H_2$ over HP-50 steel chips in a Lindberg Quartz tube furnace.

| | Cr "Paint"* on HP50 | Cr Plate** on HP50 | Untreated HP50 |
|---|---|---|---|
| 1600° F. | Trace of coke uncarburized | Essentially coke free uncarburized | Coked Carburized |
| 2000° F. | Trace of coke uncarburized | Substantially coke free Carburized | Coked |

*$CrCl_2$ powder on HP-50 reduced 2 hrs. at 1500° F. in $H_2$
**Commercial hard Cr plate on HP-50 heat treated in $H_2$ 1500 F. 2 hrs.

Microscopy analysis revealed a chromium-carbide bonding layer between the chromium coatings and the underlying steel in the chromium-treated samples.

EXAMPLE 4

An HP-50 steel chip was treated with $CrCl_2$ powder and cured in pure $H_2$ at 1500° F. for 1 hour. Microscopy analysis revealed that the chip had a high quality, continuous, uniformly thick, and firmly and cleanly attached coating of chromium, 1 mil in thickness.

EXAMPLE 5

Two INCOLOY 800 steel chips were placed in a quartz sample boat. The first had been treated with a mixture of about equal amounts of $CrCl_2$ and $MoCl_5$ powders. The second chip (downstream from the first) had been treated with a mixture of $CrCl_2$ and $WCl_6$ powders. Pure $H_2$ gas was passed over the samples in a Lindberg quartz tube furnace at 1200° F. for two hours. Microscopy analysis revealed that the first chip had a metallic coating 1–2 microns thick of chromium with about 7% Mo. The second chip had received a 1 micron coating of chromium with about 20% W and 10% Mo.

This experiment demonstrates that mixed metal coatings can be prepared from mixtures of metal salts. The molybdenum and tungsten chlorides are volatile, but the molybdenum and tungsten were incorporated into the metallic coating.

EXAMPLE 6

An HP-50 steel chip was coated with a mixture of finely ground $CrCl_3$ crystals in just enough petroleum jelly to make a viscous paint. The coated chip was cured in $H_2$ at 1500° F. for 1 hour. Microscopy analysis revealed a uniform coating of chromium metal, tightly interlocked with a similarly thick, carbide-rich bonding layer onto the underlying steel.

While the invention has been described above in terms of preferred embodiments, it is to be understood that variations and modifications may be used as will be appreciated by those skilled in the art. Essentially, therefore, there are many variations and modifications to the above preferred embodiments which will be readily evident to those skilled in the art and which are to be considered within the scope of the invention as defined by the following claims.

What is claimed is:

1. A method of thermal hydrocarbon cracking, comprising the step of thermally cracking a hydrocarbon feed in a cracking furnace comprising a steel portion having a carburization resistant protective layer that has a crack filled with a metal carbide material, a thickness effective to isolate said steel portion from said hydrocarbon feed, and is anchored to said steel portion by an intermediate carbide-rich bonding layer.

2. The method of claim 1, wherein said hydrocarbon feed comprises ethane.

3. The method of claim 1, wherein said hydrocarbon feed comprises propane.

4. The method of claim 1, wherein said hydrocarbon feed comprises naptha.

5. The method of claim 1, wherein said thermally cracking step produces ethylene.

6. The method of claim 1, wherein said steel portion exhibits a skin temperature of at least approximately 1700° F. during said thermally cracking step.

7. The method of claim 1, wherein said thermally cracking step comprises the step of adding steam in an amount less than that that would be used in the absence of said protective layer.

8. The method of claim 1, wherein said carbide material was formed by contacting said protective layer with a hydrocarbon.

9. The method of claim 8, wherein said contacting was performed in the absence of steam.

10. The method of claim 8, wherein said protective layer comprises an oxide layer on said protective layer.

11. The method of claim 10, wherein said protective layer comprises chromium and said oxide layer comprises chromium oxide.

12. The method of claim 1, wherein said protective layer was formed from a plating, cladding, or coating effective for forming said protective layer.

13. The method of claim 12, wherein said coating comprises a paint.

14. The method of claim 13, wherein said paint comprises a chromium paint.

15. The method of claim 13, wherein said paint comprises a tin paint.

16. The method of claim 12, wherein said plating comprises chrome plating.

17. The method of claim 1, wherein said steel portion is a nickel-rich steel.

18. The method of claim 17, wherein said nickel-rich steel comprises approximately 30–35% Ni.

19. The method of claim 1, wherein said steel portion is a stainless steel.

20. The method of claim 1, wherein said steel portion comprises a furnace tube.

21. The method of claim 1, wherein said steel portion comprises a heat exchanger.

22. The method of claim 1, wherein said protective layer has a thickness of approximately 0.5–10 mils.

23. A method for protecting a steel portion of a cracking furnace from carburization, comprising the steps of:
forming a carburization resistant protective layer on a steel portion of a cracking furnace that is anchored to said steel portion by an intermediate carbide-rich bonding layer; and
filling a crack in said protective layer with a carbide material.

24. The method of claim 23, wherein said forming step comprises the step of applying a plating, cladding, or coating effective for forming said protective layer.

25. The method of claim 24, wherein said applying step comprises the step of applying said plating, cladding or coating at a thickness effective to isolate said steel portion.

26. The method of claim 24, wherein said applying step comprises the step of applying a paint at a thickness of approximately 0.1–15 mils.

27. The method of claim 24, wherein said plating comprises chrome plating.

28. The method of claim 23, wherein said forming step comprises the step of applying a paint effective for forming said protective layer.

29. The method of claim 28, wherein said paint comprises a chromium paint.

30. The method of claim 29, wherein said chromium paint comprises a chromium halide.

31. The method of claim 30, wherein said chromium halide comprises a chromium chloride.

32. The method of claim 28, wherein said paint comprises a tin paint.

33. The method of claim 23, wherein said protective layer has a thickness of approximately 0.5–10 mils.

34. The method of claim 23, wherein said protective layer comprises chromium.

35. The method of claim 23, wherein said steel portion is a nickel-rich steel.

36. The method of claim 35, wherein said nickel-rich steel comprises approximately 30–35% Ni.

37. The method of claim 23, wherein said steel portion is a stainless steel.

38. The method of claim 23, wherein said steel portion comprises a furnace tube.

39. The method of claim 23, wherein said steel portion comprises a heat exchanger.

40. The method of claim 23, wherein said filling step comprises the step of contacting said protective layer with a hydrocarbon at a temperature and for a time sufficient to form a carbide material in said crack.

41. The method of claim 40, wherein said contacting step comprises the step of contacting said protective layer with said hydrocarbon in the absence of steam.

42. The method of claim 40, further comprising the step of treating said protective layer, in the absence of hydrocarbons, with steam to form an oxide layer over said protective layer.

43. The method of claim 42, wherein said protective layer comprises chromium and said oxide layer comprises chromium oxide.

44. A steel portion of a thermal cracking furnace, comprising:
a steel portion of a thermal cracking furnace;
a carburization resistant protective layer that has a crack filled with a metal carbide material, a thickness effective to isolate said steel portion from said hydrocarbon feed, and is anchored to said steel portion by an intermediate carbide-rich bonding layer.

45. The steel portion of claim 44, wherein said steel portion is a nickel-rich steel.

46. The steel portion of claim 45, wherein said nickel-rich steel comprises approximately 30–35% Ni.

47. The steel portion of claim 44, wherein said steel portion is a stainless steel.

48. The steel portion of claim 44, wherein said steel portion comprises a furnace tube.

49. The steel portion of claim 44, wherein said steel portion comprises a heat exchanger.

50. The steel portion of claim 44, wherein said protective layer has a thickness of approximately 0.5–10 mils.

51. The steel portion of claim 44, wherein said filled crack comprises a carbide material.

52. The steel portion of claim 51, wherein said carbide material was formed by contacting said protective layer with a hydrocarbon.

53. The steel portion of claim 52, wherein said contacting was performed in the absence of steam.

54. The steel portion of claim 52, wherein said protective layer comprises an oxide layer on said protective layer.

55. The steel portion of claim 54, wherein said protective layer comprises chromium and said oxide layer comprises chromium oxide.

56. The steel portion of claim 44, wherein said protective layer was formed from a plating, cladding, or coating effective for forming said protective layer.

57. The steel portion of claim 56, wherein said coating comprises a paint.

58. The steel portion of claim 57, wherein said paint comprises a chromium paint.

59. The steel portion of claim 57, wherein said paint comprises a tin paint.

60. The steel portion of claim 56, wherein said plating comprises chrome plating.

* * * * *